United States Patent [19]

Maxey

[11] 3,940,854
[45] Mar. 2, 1976

[54] THREE AXIS PRECISION MEASURING DEVICE

[75] Inventor: Robert E. L. Maxey, North Huntingdon, Pa.

[73] Assignee: Westinghouse Electric Corporation, Pittsburgh, Pa.

[22] Filed: Mar. 27, 1974

[21] Appl. No.: 455,160

[52] U.S. Cl............. 33/174 L; 33/125 R; 33/172 R
[51] Int. Cl.².......................................... G01B 3/22
[58] Field of Search .......... 33/174 L, 174 R, 125 R, 33/172 RD, 174 P, 169 R, 169 C

[56] References Cited
UNITED STATES PATENTS

| | | | |
|---|---|---|---|
| 1,842,502 | 1/1932 | Blomquist | 33/172 R |
| 2,353,726 | 7/1944 | Gutlmann | 33/125 R |
| 3,164,909 | 1/1965 | Rosenberg | 33/174 L |
| 3,216,120 | 11/1965 | Sweigart et al. | 33/174 PA |
| 3,520,063 | 7/1970 | Rethwish et al. | 33/174 L |
| 3,660,906 | 5/1972 | Zimmerman | 33/174 L |
| 3,808,696 | 5/1974 | Possati | 33/174 L |
| 3,869,799 | 3/1975 | Never et al. | 33/169 R |

Primary Examiner—Richard E. Aegerter
Assistant Examiner—John W. Shepperd
Attorney, Agent, or Firm—George M. Medwick

[57] ABSTRACT

A measuring device for measuring three dimensions of a member. Abutting contact between the member and measuring means movably disposed in three orthogonal directions within the device displaces each measuring means a predetermined overage distance, disposing the member exactly a predetermined distance from an axis extending through the device. Gauge means accurately indicate when the measuring means is displaced the predetermined overage distance.

6 Claims, 7 Drawing Figures

FIG. 2

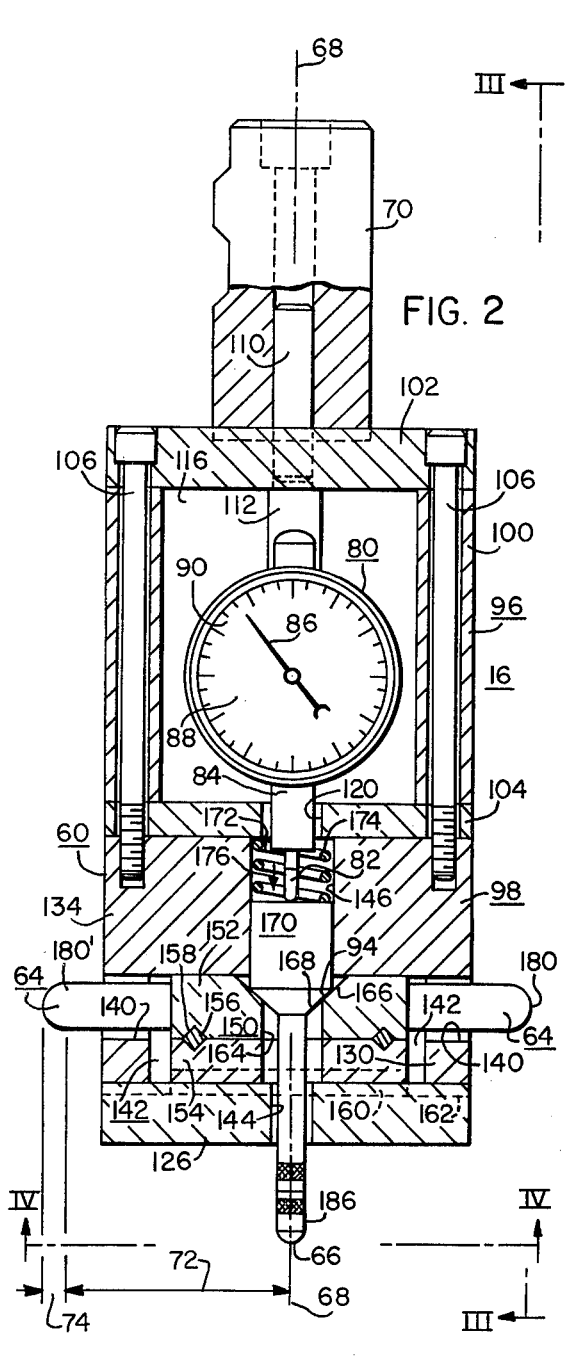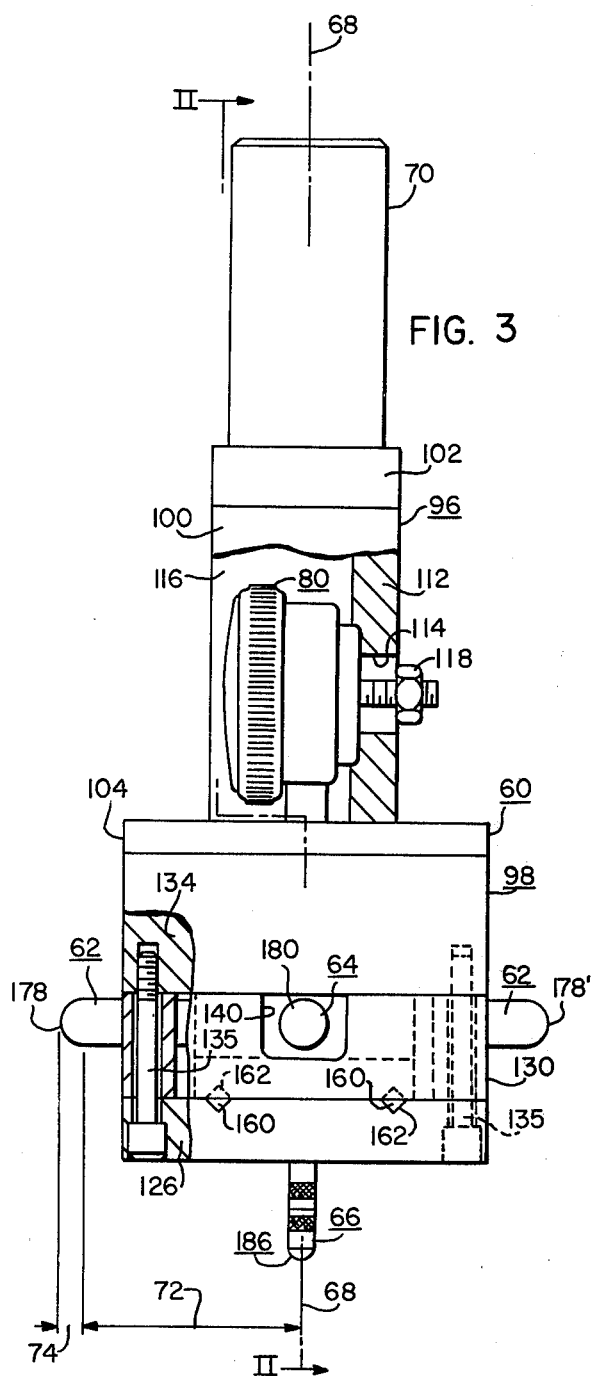
FIG. 2
FIG. 3

THREE AXIS PRECISION MEASURING DEVICE

BACKGROUND OF THE INVENTION

1. Field of the Invention

This invention relates to measuring tools, and in particular, to a three-dimensional measuring device for use on a machine tool having a numerical position readout.

2. Description of the Prior Art

The fabrication of large turbogenerator apparatus requires precise machining and dimensioning or else faulty manufacture may result in premature failure of the apparatus. Presently, the measurement of each dimension for members fabricated for use in large dynamoelectric apparatus is done by using a separate measuring device for each measurement that is required to be taken. Each measurement device, whether micrometer, pin gauge, or journal, which must be used in the measurement process is calibrated in a meter room and brought to the work floor to the stock on which machining is being performed, and the measurement is then taken.

The various gauges, in addition to being difficult to calibrate, are each possibly subject to varying degrees of accuracy due to varying responses to temperature and humidity conditions. In addition, some devices are cumbersome to use and may require more than one man to operate. Often, such gauges rely upon an operator's "touch" rather than more objective criteria. As an example, measurements on the order of 20–25 feet, with permissible tolerances of thousandths of an inch, such as those taken for bore of a large dynamoelectric apparatus unit, are usually accomplished by two men using a pin gauge that is precisely measured by electronic techniques in the meter room.

The pin gauge is an elongated metal rod that, for purposes of the measurement, is held in place by one workman against one point on the stock being machined. The second end of the gauge is then swung by the second workman in short acrs using the first workman's pivot point as center of the arc. The degree of abrasion between the second end of the pin gauge and the stock opposite the pivot point indicates to a skilled workman the overage that must be trimmed in order to meet the prescribed dimension.

Of course, it is plain that such a pin gauge is affected by temperature and humidity conditions which might change its dimension slightly from the meter room to the work floor. But more importantly, the gauge is cumbersome to use and relies upon the "feel" of the workman, and not upon some more objective standard.

When measuring more than one dimension, it is required that a separate gauge for each dimension be brought from the meter room to the work floor and the measurements taken of the stock being machined. In addition to the variations induced in each gauge by the change in temperature and humidity conditions from the meter room to the work floor, the time involved in taking separate measurements, some measurements involving two workmen, is expensive. It is apparent therefore that a more accurate and expeditious measuring device able to measure the dimension of machined stock on each of three orthogonal dimensions is required.

SUMMARY OF THE INVENTION

This invention discloses a measuring device having first, second and third measuring means movably disposed within an outer casing. The first and the second measuring means are disposed in a plane perpendicular to an axis extending through the casing and through the third measuring means. Both the first and the second measuring means are disposed a predetermined distance plus a known overage distance away from the central axis. Gauge means indicate when abutting contact between a member to be measured displaces the measuring means the overage distance, thus assuring that the member is exactly the predetermined distance from the reference axis. The third measuring means is operably connected to the gauge means, and only forces directed along the reference axis will activate the gauge means. Force transfer means translate a force exerted on either the first or the second measuring means in a plane perpendicular to the reference axis to a force acting along the reference axis so as to activate the gauge means.

It is an object of this invention to provide a measuring device capable of measuring three dimensions of stock being machined. It is a further object of this invention to dispose a measuring device able to measure each of three dimensions of stock being machined upon a machine tool having a numerical position readout and have a measuring device capable of measuring dimensions in each of the three dimensions without reorienting the measuring device from its original attached position.

BRIEF DESCRIPTION OF THE DRAWINGS

The invention will be more fully understood from the following detailed description, taken in connection with the accompanying drawings, in which:

FIG. 2 is an elevational view, partly in section, of a measurement device embodying the teachings of this invention;

FIG. 3 is an elevational view taken along line III—III of FIG. 2;

DESCRIPTION OF THE PREFERRED EMBODIMENTS

Figure 1:
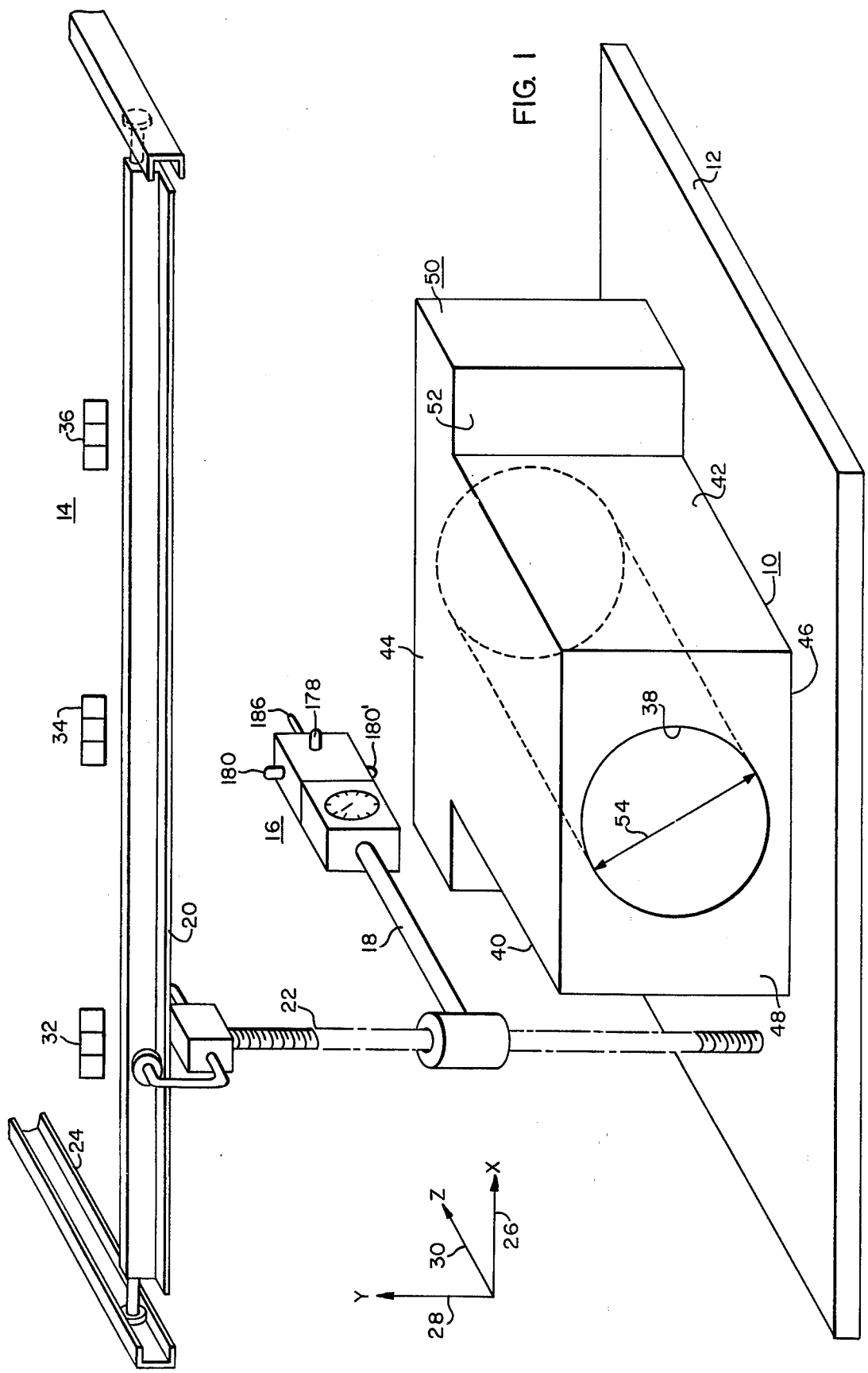
FIG. 1 is perspective view of a measuring device taught by this invention utilized with a machine tool to measure the dimensions of a workpiece.

Throughout the following description, similar reference characters refer to similar elements in all figures of the drawings.

FIG. 1 illustrates a workpiece 10 for a dynamoelectric apparatus, such as a turbogenerator, mounted on a work table 12 of a machine tool 14. The tool 14 can be any power operated tool, such as a core drill or a reamer, having a measuring head 16 taught by this invention mounted on a toll arm 18. It is to be understood that the measuring device 16 occupies the same position on the machine tool 14 that a tool head member which performs the machining function normally occupies. The tool arm 18 on which the measuring device 16 is mounted is movable upon suitable brackets 20, 22 and 24 in three orthogonal directions, corresponding to the directions indicated on the cartesian coordinate axis 26, 28 and 30. In FIG. 1, numeral 26 represents the X axis, numeral 28 the Y axis, and numeral 30 the Z axis. Hereinafter, motion of the measuring device 16 to the right or to the left along bracket 20 will be described as motion in the positive or negative X direction respectively. Similarly, motion of the measuring device 16 upward or downward along the bracket 22 will be defined as motion in the positive or negative Y direction, while movement of the measuring device into and out of the plane of the paper along the bracket 24 will be defined as motion in the positive or negative Z direction respectively.

The magnitude of the displacement of the measuring device 16 can be ascertained from numerical displays 32, 34 and 36 mounted on the machine tool 14. The display 32 indicates the magnitude of the displacement of the device 16 while mounted on the arm 18 in the X direction 26, the display 34 indicating the magnitude of displacement of the tool head 16 in the Y direction 28, and the magnitude of displacement of the tool head 16 in the Z direction 30 is indicated by the numerical display readout 36.

As illustrated in FIG. 1, the workpiece 10 is a substantially rectangular member having a central axial bore 38 disposed therethrough. The workpiece 10 has rectangular sides 40 and 42 thereon, a top surface 44 and a bottom surface 46, and a frontal surface 48. The workpiece 10 also has a flange portion 50 having a surface 52 substantially parallel to the frontal surface 48. The distance between the parallel surfaces 48 and 52 defines a step extending in the Z direction 30. The various surfaces of the workpiece 10 hereinbefore described are relevant to the description later described as to the method of operation of the measuring device 16.

In the prior art, whenever it is described to accurately obtain the measurement of the piece upon which work has been done, a separate gauge is usually required for each measurement. For example, different gauges would be utilized to measure the width (defined as the distances between sides 40 and 42) and the heighth (the distance between top 44 and bottom 46) of the workpiece 10. In addition, a third gauge, commonly a pin gauge, is utilized to measure the diameter 54 of the bore 38 of the workpiece 10. The pin gauge is an elongated metal rod which requires two workmen in order to obtain the measurement sought.

As an example in the prior art, the diameter 54 of the bore 38 of the workpiece 10 is measured utilizing the pin gauge as follows: one of the workmen would pivotally hold one end of pin gauge to the inside diameter of the workpiece at one side thereof. Relative to FIG. 1, then, the first workman would pivotally hold the pin gauge at a point on the inside diameter of the bore 38 nearest the top surface 44. A second workman would then swing the other end of the pin gauge in short arcs, with the pivot point held by the first workman as the center of the arc, and through his "touch" or "feel" determine the amount of abrasion between the inside of the bore 38 near the bottom surface 46 opposite the point of pivoting of the pin gauge. The degree of abrasion between the second end of the pin gauge and the inside diameter of the workpiece 10 near the bottom surface 46 indicates to a skilled workman how much machining must still be required in order for the bore 38 to reach a prescribed tolerance. Commonly, diameters of workpieces such as is illustrated in FIG. 1 extend distances of 20 to 25 feet, while the tolerances sought to be measured using the pin gauge device extend to the range of thousandths of an inch.

It is apparent that such a subjective test relying upon the feel of an operator, however skilled, is an inherently inaccurate measurement process. And, the pin gauge itself may produce variations in its length due to its response to different temperature and humidity conditions on the work floor than were present in the meter room when the pin gauge was electronically measured. Thus, to use the prior art method to attempt to accurately determine dimensions such as the diameter of a bore is disadvantageous. The precise tolerance, down to thousandths of an inch, is required, to avoid the possibility of manufacturing inaccuracies in dimensioning between constituent parts of the apparatus which could lead to premature failure.

Of course, the example of the prior art method of measurement described above for the bore of the workpiece is only illustrative. But similar problems of operator error occur when attempting to measure any dimension of any stock which must be machined. Also, any gauge, either pin gauge, micrometer, journal or any gauge, which are set in meter rooms undergo variations due to temperature and humidity changes on the work floor. Thus, it is apparent that some device which accurately measures all three dimensions without the necessity of relying upon subjective operating feeling or touch, and with a minimum of temperature and humidity variations, is desirable. In addition, it is desirable to have a measuring device which need not be reoriented from its original position when measuring each of the three directions.

The tool head 16 taught by this invention is a device which fulfills these needs.

Referring to FIGS. 2 and 3 of the drawings, front and side elevational views, respecitvely, each partially in section, illustrate the measuring device 16 embodying the teachings of this invention. The device 16 generally comprises an outer casing as indicated at 60 in which movable measuring means 62, 64 and 66 are disposed. The measurement means 62 and 64 are disposed in a plane perpendicular to a reference axis 68 which extends centrally and axially through the interior of the casing 60. The third measurement means 66 is movable within the casing 60 along the reference axis 68.

The entire device 16 is connected to the arm 18 of the machine tool 14 (FIG. 1) by mounting means 70 coaxially secured to the casing 60. The first measuring means 62 and the second measuring means 64 are each disposed a predetermined distance 72 plus a known overage distance 74 from the axis 68. Gauge means 80 are provided and indicate when abutting contact between the measurement means 62 or 64 and the workpiece 10 (FIG. 1) is sufficient to displace the first measurement means 62 or the second measurement means 64 the predetermined overage distance 74 and thereby dispose the workpiece 10 exactly the predetermined distance 72 away from the reference axis 68.

For clarity, it is to be understood that, in FIG. 1, the first and second measurement means 62 and 64 lie along the X axis 26 and the Y axis 28, respectively, and that the third measurement means 66 lies along the Z axis 30, as shown. It is to be further understood that the first measurement means 62 and the second measurement means 64 need not be disposed in the same plane, although they are shown as being so disposed. In addition, the overage distances 74 need not be equal for the first measurement means 62 as for the second measurement means 64, and the predetermined distance 72 away from the reference axis 68 need not be equal for the first measurement means 62 and for the second measurement means 64.

The third measurement means 66 is movable along the reference axis 68 and is operably connected to an actuator pin 82 of the gauge means 80. The operating pin 82 is reciprocally disposed in a cylinder 84 and, when depressed, the pin 82 deflects a needle 86 that is internally biased within the gauge means 80 so as to deflect the needle 86 across a faceplate 88 having marked gradations 90 thereon. The gauge means 80 is operable only be reciprocal deflection of the pin 82 along the axis 66 and thus responds only to forces directed upon the gauge 80 along the reference axis 68. So that forces imposed upon the first and the second measuring means 62 and 64 respectively, which lie in a plane perpendicular to the reference axis 68, may actuate the gauge 80, force transmission means 94 are disposed within the casing 60 and translate forces which are imposed in a plane perpendicular to the reference axis 68 to forces which act upon the reference axis 68 and which can therefore activate the pin 82 of the gauge 80. The force transmission means 94 will be more fully described herein.

The casing 60 is comprised of a gauge support portion 96 and a measuring head support portion 98. The gauge support portion 96 is itself comprised of a three-sided body member 100 having connected thereto a cover plate 102 and a bottom plate 104. The cover plate 102 and the bottom plate 104 are connected to the body 100 by suitable attachment means such as bolts 106. The attachment shaft 70 is received by the cover plate 102 and securely affixed thereto by suitable attachment means such as the screw 110. The body member 100 has an axially extending support tongue 112 therein, the tongue 112 having an opening 114, as best seen in FIG. 3. The body member 100, cover plate 102 and bottom plate 104 define a gauge chamber 116 therein. The gauge 80 is disposed within the gauge chamber 116 and secured in a predetermined position therein by suitable attachment means such as a lock nut 118 which extends from the back of the gauge 80 through the opening 114 in the body member 100. The pin 82 and pin cylinder assembly 84 extend through an opening 120 disposed centrally and axially within the bottom plate 104.

The measurement head support portion 98 of the casing 60 comprises a base plate 126 connected to a transition plate 130, which is in turn connected to a mating plate 134 by an elongated screw 135. The mating plate 134 is connected by suitable means such as an extension of the bolt 106 to the bottom plate 104 of the gauge support portion 96 of the casing 60. The transition plate 130 has four orthogonally disposed apertures 140 disposed therein, the apertures 140 permitting communication between the exterior of the device 16 and a cavity 142 defined within the measurement head support portion 98. Central axial openings 144 and 146 are disposed through the base plate 126 and the mating plate 134 respectively. The opening 144 permits communication between the central cavity 142 and the exterior of the device 16, while the opening 146 communicates with the opening 120 in the bottom plate 104 and the cavity 142.

Movably disposed within the cavity 142 is a measurement head support plate generally indicated by the reference numeral 150. The support plate 150 comprises a top support plate 152 and a bottom support plate 154. The top support plate 152 is slidably disposed relative to the bottom support plate 154 within the cavity 142. To facilitate sliding motion between the top support plate 152 and the bottom support plate 154, keys 156 are disposed within in corresponding key ways 158 in the top support plate 152 and the bottom support plate 154. The entire measurement head support 150 is slidably disposed relative to the base plate 126 within the cavity 142 on keys 160. Keys 160 are disposed in corresponding key ways 162 disposed between the bottom plate 154 and the interior surface of the base plate 126. To facilitate the sliding motion described above, suitable lubrication, such as graphite or silicon grease, may be disposed in the key ways 158 and 162.

As is apparent from inspection of FIGS. 2 and 3, the top support plate 152 slides with respect to the bottom support plate 154 on keys 156 into and out of the plane of the paper in FIG. 2 and in a left-to-right direction in the plane of the paper in FIG. 3. Conversely, keys 160 permit sliding motion between the entire support structure 150 and the base plate 126, this sliding motion occurring to the right and left in the plane of the paper of FIG. 2 and into and out of the plane of the paper in FIG. 3.

Referring to FIG. 2 only, due the disposition of keys 156 and 160, it is seen that only one of the two above described sliding motions can occur in one orthogonal direction at one particular time. Thus, if the support assembly 150 were sliding to the right or to the left in FIG. 2 along keys 160, the top plate 152 is prohibited from sliding into and out of the plane of the paper because keys 156 act as a lock to prohibit this sliding motion. Similarly, when top plate 152 slides into and out of the plane of FIG. 2 with respect to bottom plate 154 on keys 156, motion of the entire assembly 150 in the left to right direction is prohibited by the disposition of keys 160. It is thus seen that the entire assembly 150 may slide to the left or right or that the top plate 152 may slide into and out of the plane of FIG. 2, but both sliding motions may not occur simultaneously due to the locking effect provided by the perpendicularly disposed keys 156 and 160.

The measurement head support assembly 150 has a central axial opening 164 extending therethrough, the opening 164 aligning with the opening 144 extending through the base plate 126 and with the opening 146 extending through the mating plate 134. The opening 164 flares axially outward as it extends through the top cover plate 152 and defines a frusto-conical surface area 166 surrounding the opening 164 within the top cover plate 152. The frusto-conical surface 166 corresponds with frusto-conical surface area 168 which is disposed upon a cylindrical member 170. The cylindrical member 170 is slidably disposed along the axis 68 within the opening 146 passing through the mating plate 134. The top surface of the cylindrical member 170 abuts the pin 82 of the gauge 80 and with the interior of the mating plate 134 and the bottom plate 104 defines a spring chamber 172. A bias spring 174 is disposed within the spring chamber 172 and exerts a force acting on the cylindrical member 170 in a direction 176.

Mounted on the top cover plate 152 of the head support assembly 150 are the first sensing means 62 and the second sensing means 64. The first sensing means 62 comprise a set of elongated pin members 178 and 178' while the second sensing means 64 comprises a set of pin members 180 and 180'. Each corresponding pair of pins members 178 and 178' and 180 and 180' are displaced 180° apart and extend through one of the orthogonally disposed apertures 140 within the transition plate 130. It is seen by securing the elongated pin members 178, 178' and 180, 180' to the top cover plate 152 of the support assembly 150, the first means 62 and the second means 64 are movably disposed within the casing 60. Movement of the support assembly 150 or the top plate 152 to the right or to the left within the cavity 142 or into and out of the plane of the paper in FIG. 2, respectively, will, because of the abutments of frusto-conical surfaces 166 and 168, translate motion which occurs in a plane perpendicular to the axis 68 into a force acting along the axis 68.

It is observed that corresponding frusto-conical surfaces 166 and 168 and the slidable cylindrical member 170 comprise the force translation means 94 which permit forces which have been exerted on the sensing heads 64 and 66 in a plane perpendicular to the axis 68 to be translated into a force acting along the reference axis 68 and thus able to operate the gauge 80. Due to the locking effect of the keys 156 and 160, motion of the first measurement means 62 (which comprise the pair of elongated pins 178 and 178') can occur into and out of the plane of paper in FIG. 2 on keys 156 while motion of the second sensing means 64 (which comprise the pair of elongated pins 180 and 180') can occur to the right or to the left of the plane of the paper in FIG. 2 on keys 160. Because of the locking effect of the keys 156 and 160, only one sliding motion either of the first measurement means 62 or of the second measurement means 64 can occur at one time. From examination of FIGS. 2 and it is evident that a force on the first measurement means 62 or the second measurement means 64 acting in the plane perpendicular to the axis 68 is translated by the force translation means 94 into a force acting along the reference axis 68 so as to operate the gauge 80.

The third measurement means 66 comprises an elongated pin 186 which extends axially through the opening 144 within the base plate 126 and is secured to the cylindrical member 170. The spring 174 biases the third measurement means 66 into a first position. Displacement of the pin 186 along the axis 68 against the force of the spring 174 will operate the gauge 80. By displacing the gauge 80 at varying predetermined position within the chamber 116 will vary the magnitude of displacement of the measuring means 62, 64 and 66 necessary to operate the gauge 80.

Figure 4:
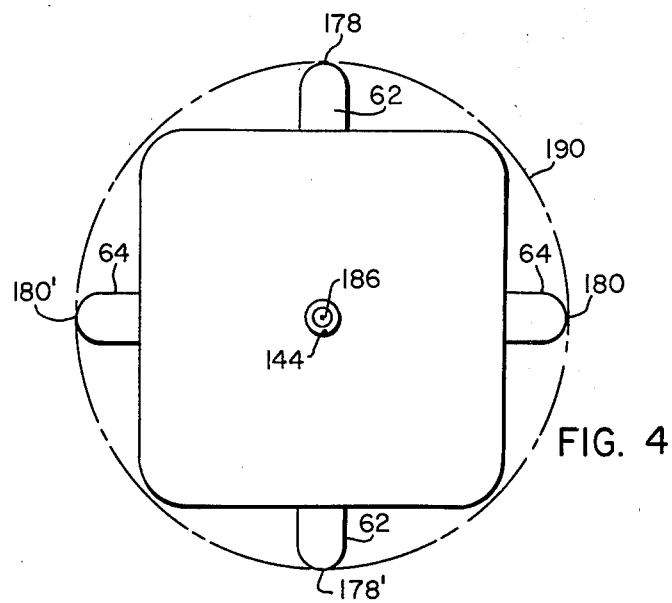
FIG. 4 is a view taken along line IV—IV of FIG. 2.

Referring now to FIG. 4, a view taken along lines IV—IV of FIG. 2 is shown. The pair of elongated pins 178-178' which comprise the first measurement means 62 and the pair of diametrically opposed elongated pins 180 and 180' which comprise the second measurement means 64 are shown as extending orthogonally to each other through the aperture 140 within the transition plate 130 (FIGS. 2 and 3). The tips of the pins 178 and 178' and 180 and 180' are machined precisely such that a circle 190 having the reference axis 68 as its center will pass precisely through the tips of the pins 178, 178' and 180 and 180'. The circle 190 has a diameter of exactly 4.050 inches, and a radius of 2.025 inches. The tip of any of the pins 178, 178', 180 or 180' is thus exactly 2.025 inches away from the reference axis 68. Of this 2.025 inches, the distance 72 (FIGS. 2 and 3) is precisely 2 inches while the predetermined overage distance 74 is precisely 0.025 inch. The quantities recited are for illustration only and are intended, in no way, to be limiting.

Referring again to FIGS. 2 and 3, if the second measurement means 64, which comprise the diametrically opposed pins 178 and 178', is displaced the overage distance 74 by abutting contact with the member to be measured, the member will then be disposed the predetermined distance 72 of precisely 2 inches from the reference axis 68. Similarly, if the second measuring means 64, which comprises the diametrically opposed pins 180 and 180', is displaced by abutting contact with the member to be measured the overage distance 74, the member will be disposed the predetermined distance 72 of exactly 2 inches from the reference axis 68. It is also seen that due to the connection through the force transition means 94, the amount of the displacement can be indicated upon the gauge means 80 and accurately indicate to an external observer that the tip of the first or second measurement means 62 and 64 respectively has been displaced the predetermined overage distance 74. By disposing the gauge means 80 in a predetermined position within the chamber 116 and by securing the lock nut 118 so as to maintain the gauge 80 at that predetermined position, the pin 82 will be abutted against the top of the cylindrical member 170 and by recording the deflection of the needle 86 across the face 88 of the gauge 80 one may accurately ascertain whether the first or the second measurement means 62 and 64 have been displaced the predetermined overage distance 74 by abutting contact with the member to be measured. Once the abutting contact between the member and the measurement means, is ended, the spring 174 returns the pin 82 to its original undisplaced position a predetermined distance 72 plus a predetermined overage distance 74 from the axis 68. Any convenient overage distance and any predetermined distance from the reference axis may be used; any magnitude of deflection of the needle 86 across the face 88 of the gauge 80 can be used as a convenient indication that the measurement means 62 and 64 have been displaced the overage distance by abutting contact with the member.

Figure 5:
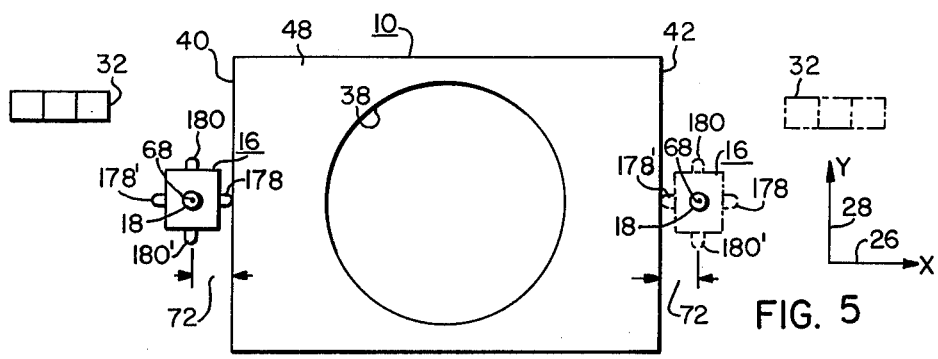
FIG. 5 shows the utilization of the measuring device taught by this invention to obtain the dimensions of a member.

To demonstrate the operation of the device 16, three separate measurements on the workpiece 10 will be described. Although utilization of the device is described in connection with the fabrication of a large dynamoelectric apparatus, such as a turbogenerator, it is to be understood that the measuring device taught by this invention is applicable to determine the dimensions of any article of manufacture or any measurement requirement of any kind. The first measurement to be described is the measurement of the width of the workpiece 10. The width is defined as the distance between the left-hand surface 40 and the right-hand surface 42 of the workpiece 10 (FIG. 1). In order to more clearly point out the operation of the measuring device 16 when measuring the width of the workpiece 10, reference is directed to FIG. 5. In FIG. 5, a front view of the workpiece 10 showing the frontal surface 48, the bore 38, the left surface 40 and the right surface 42 is illustrated. The parallel surface 52 of the flange 50 is omitted from FIG. 5 for clarity.

As was stated earlier the device 16 is fastened to a machine arm 18 by suitable attachment means 70. It is also noted that the device 16 and the arm 18 are movable on a bracket 20 toward the left and toward the right in FIG. 5. This movement to the right will be defined as lying in a positive X direction relative to the X axis 26, while movement to the left will be described as movement in the negative X direction. The magnitude of displacement in the X direction of the arm 18 on the bracket 20 is accurately indicated by the numerical readout 32 positioned on the machine tool 14.

The device 16 is mounted on the machine tool arm 18 in a predetermined orientation and, it is to be understood that throughout the illustrative measurements utilizing the device 16 this orientation is not to be altered. As stated earlier, the first measurement means 62 comprises the set of diametrically opposed elongated pins 178 and 178'. The pins 178 and 178' are oriented so as to lie along the X axis 26, the pin 178 being directed in the positive X direction while the pin 178' is directed in the negative X direction. As a natural consequence, the second measurement means 64 comprising the set of diametrically opposed elongated pins 180 and 180' lie in the Y direction 28, with the pin 180 directed in the positive Y direction while the pin 180' is directed in the negative Y direction.

After the device 16 has been securely attached in a predetermined orientation on the arm 18 on the machine tool 14, the gauge means 80 are adjusted so that the magnitude of any displacement of the first measurement means 62 caused by abutting contact between the first measurement means 62 and the workpiece 10 can be accurately determined. Again it is to be pointed out that the structure of the preferred embodiment disposes the tip of each elongated measuring pin the first predetermined distance 72 equal to two inches and the second predetermined overage distance 74 equal to twentyfive thousandths of an inch.

The gauge means 80 are calibrated so that the displacement of the first measurement means 62 the overage distance 74 of twenty-five thousandths of an inch may be accurately determined. Any convenient reference datum across the facr of the gauge 80 may be utilized, but the most expeditious method for determining the magnitude of the displacement would be for the gradations 90 on the face 88 of the gauge 80 to correspond directly to the unit of measurement which most clearly discloses the magnitude of the overage distance 74. In this particular instance, since the overage distance 74 is twenty-five thousandths of an inch, the gradations 90 on the face 88 of the gauge 80 are calibrated in thousandths of an inch. Thus, deflection of the needle 86 across one gradation 90 on the face 88 of the gauge 80 is equal to the displacement of the measurement means 62 one-thousandth of an inch. When the needle 86 is deflected 25 gradations on the face 88 of the gauge 80, an observer may be assured that the forces exerted by the member on the measurement means 62 is sufficient to displace the measurement means the predetermined overage distance 74, and that the member is disposed exactly the predetermined distance 72 away from the reference axis 68.

To measure the width of the workpiece 10, the device 16 is moved on the bracket 20 to the left-hand side of the left surface 40 the workpiece 10. The device 16 is then moved in the positive X direction until abutting contact between the first of the elongated pins 178 is established between the pin 178 and the left-hand surface 40 of the workpiece 10. The abutment is sufficient so that the member 10 exerts the force on the pin 178 to displace the pin 178 the predetermined overage distance 74. This force acts in a plane perpendicular to reference axis 68 and thus the force transmission means 94 translates the force acting in the plane perpendicular to the reference axis 68 to a force acting along the reference axis 68 and sufficient to activate the gauge means 80. A deflection of the gauge means 80 of twenty-five gradations 90 is equal to a displacement of the first pin 178 the predetermined overage distance 74. When the gauge means 80 indicates that the first pin 178 has been displaced the predetermined overage distance 74 the operator is assured that the left-hand surface 40 of the workpiece 10 is exactly the predetermined distance 72 of two inches from the reference axis 68 of the device 16.

At this point, the reading on the numerical readout 32 is either recorded or else changed to a particular reference datum. This value constitutes the first readout value. Abutting contact between the device 16 and the left-hand surface 40 of the workpiece 10 is then broken. When this occurs, of course, the spring 174 impels the pin 178 back to its original position within the casing 60, thus disposing the tip of the pin 178 the predetermined distance 72 plus the known overage distance 74 away from the reference axis 68. The device 16 is then translated across the bracket 20 in the positive X direction until the second pin 178', which lies diametrically opposed from the first pin 178, is immediately to the right of the right-hand surface 42 of the workpiece 10.

The next step is to displace the device 16 in the negative X direction until abutting contact between the right-hand surface 42 of the workpiece 10 and the pin 178' is sufficient to displace the pin 178' the overage distance 74. Since this force acts in a plane perpendicular to the reference axis 68, the force transmission means 94 again come into play so that the magnitude of the displacement of the second pin 178' can be accurately followed on the gauge means 80. When the contact is sufficient to displace the pin 178' the predetermined overage distance 74, the operator is assured that the right-hand surface 42 of the workpiece 10 is exactly the predetermined distance 72 of exactly 2 inches from the reference axis 68. At this point, the value appearing on the readout control 32 is again recorded. This value is the second readout value.

To accurately determine the width dimension of the workpiece 10 between the left-hand surface 40 and the right-hand surface 42 the magnitude of the differences between the second recorded value on the readout 32 and the first recorded value on the readout 32 is taken. This, however, is subject to a correction factor since the first recorded value indicates the position of the device 16 when it is disposed two inches to the left of the left-hand surface 40. Similarly, the second readout value occurs when the device 16 is disposed 2 inches to the right of the right-hand surface 42 of the workpiece 10. It is thus apparent that a correction of four inches must be made to the dimension determined by calculating the difference between the second readout value and the first readout value on the indicator 32.

Figure 6:
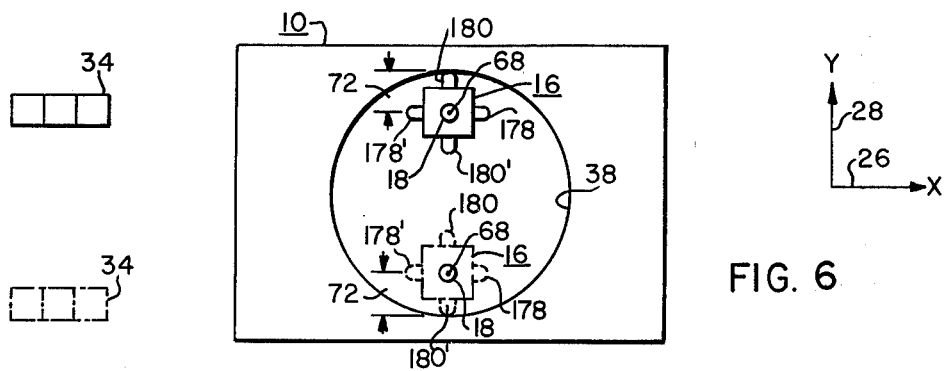
FIG. 6 is a view similar to FIG. 5.

The device 16 can be utilized to determine the dimension 54 of the bore 38. It will be recalled the difficulty involved in obtaining this dimension using the pin gauge of the prior art. Referring to FIG. 6, a view similar to FIG. 5 is shown. Since the orientation of the device 16 on the tool arm 18 is unchanged from that of FIG. 5, the second measurement means 64 which comprise the set of diametrically opposed elongated pin members 180 and 180' is along the positive and the negative Y directions 28 respectively. The second readout 34 will be utilized to display the magnitude of displacement of the device 16 in the Y direction 28 along the bracket 22 (FIG. 1). The first step in measurement of the dimension of the bore 54 is to bring the pin 180 into abutting contact with the top inner surface of the bore 38. The view in FIG. 6 is shown as occurring in the top uppermost position in the bore 38 and is so illustrating so as to demonstrate use of the device 16 for measurement in the vertical or Y direction 28. The pin 180 is brought into abutting contact so that the member 10 exerts a force on the pin 180 sufficient to displace the pin 180 the predetermined overage distance 74. Since this force acts in a plane perpendicular to the reference axis 68 the force transmission means 94 translate this force into a force acting in the direction of the reference axis 68 so as to activate the gauge means 80. The displacement of the pin 180 is accurately determined when the gauge 80 has been deflected the predetermined number of gradations 90. When this occurs the operator is assured that the member is disposed precisely the predetermined distance 72 of exactly 2 inches from the reference axis 68. At this point, the value on the Y readout 34 is recorded or else adjusted to a suitable reference datum. This setting constitutes the first readout value.

Abutting contact between the pin 180 and the member 10 is then broken and the spring 174 impels the pin 180 to its first position within the casing 60 the predetermined distance 72 plus the overage distance 74 away from the reference axis 68. The device 16 is then displaced in the negative Y direction 28 and is disposed so that the second pin 180' is brought into abutting contact with the opposite surface of the bore 38. The abutting contact is maintained until a force sufficient to deflect the pin 180' the predetermined overage distance 74 has been recorded on the gauge 80. When this occurs, the operator is assured that the member 10 is disposed precisely the predetermined overage distance 74 of exactly 2 inches from the reference axis 68. The second recorded value on the readout 34 is then taken, and the magnitude of the displacement and therefore the dimension of the diameter of the bore 38 can be accurately determined.

However, the difference between the second recorded value on the readout 34 and the first recorded value taken on the readout 34 must be corrected since both readings were taken when the device was disposed the predetermined distance 72 of two inches away from the member 10. It is thus apparent that a correction of four inches must be added to the value of the displacement obtained by taking the difference of second readout value and the first readout value.

To generalize, when the device 16 is utilized externally to the member 10, as was the case when measuring the dimension of the width in connection with FIG. 5, a correction of four inches must be subtracted from the value obtained by taking the difference of the readout values. However, when the device 16 is utilized and measuring from the inside of the member, as is the case in conjunction with FIG. 6, a correction factor must be added to the difference of recorded readouts. It is also to be understood that the descriptions for utilizing the device 16 taught by this invention are illustrative only and that suitable process by which the dimensions of the workpiece may be obtained using a measurement device 16 is within the teachings of this invention.

Figure 7:
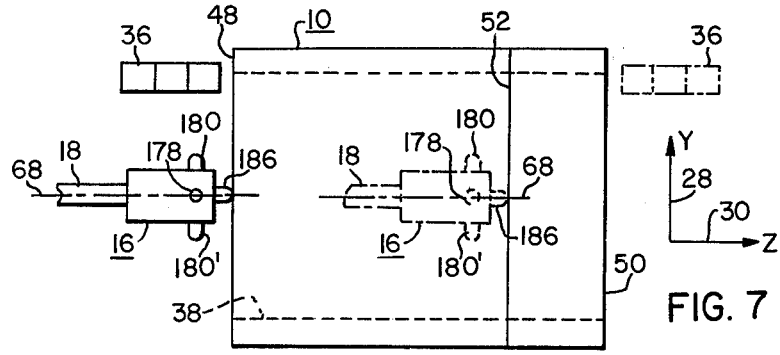
FIG. 7 is a view similar to FIG. 5 showing the utilization of the measuring device taught by this invention to obtain the dimensions of a member.

Referring to FIG. 7, measurement in the Z direction 30 is possible and may be obtained without disorienting the device 16 from its original position on the tool arm 18. To measure the distance of the step between surfaces 48 and 52 of the member 10 in the Z direction 30, the third measurement means 66, which comprises the elongated pin 186 connected operably to the pin 82 of the gauge 80 through the cylinder 170, the tool arm 18 is brought into position just abutting the frontal surface 48 on the workpiece 10. However, to ensure accuracy, it is recommended that the abutting contact be sufficient to displace the needle 86 on the gauge 80 any predetermined distance. It is of course recognized that the force transmission means 94 are not involved in such a deflection since the force imposed on the pin 186 will be directly transmitted along the axis 68 against the force of the spring 174 to deflect the pin 82 of the gauge 80.

Once the gauge 80 has been deflected any predetermined distance, the readout 36 of the machine tool 14 is recorded or adjusted to a predetermined setting. The device is then displaced in the Z direction 30 along the bracket 24 (FIG. 1) until the pin member 186 abuts against the surface 52 of the flange 50. Again, to ensure accuracy, the machine tool 14 displaces the pin 186 the same predetermined distance that the pin 186 was displaced previously against the frontal surface 48. The value of the readout 36 is again recorded. When this has occurred, the operator is assured that the difference between the second readout value and the first readout value on the indicator 36 is an accurate measure of the distance in the Z direction 30 of the step on the workpiece 10.

It is seen that the device 16 may be utilized to measure the dimensions in the X direction 26, the Y direction 28 and the Z direction 30 without the necessity of having to reorient the device 16 from its original position on the tool arm 18. Correction factors must be added or subtracted, to values obtained from readouts in the X and Y directions depending upon the method of measurement, when determining the value of the dimension measured by the first and the second measurement means 62 and 64 respectively. No correction factor need be added or subtracted to the values obtained from readout 36 in the third measurement direction. But, in order to ensure accuracy, it is recommended that the third means 66 be displaced the same predetermined distance, as indicated by the gauge 80, before the first value on the readout and the second value on the readout are taken.

Although a machine tool 14 having numerical readouts 32, 34 and 36 is used along with the device 16 to determine the dimensions of the workpiece 10, it is of course understood that any suitable method for obtaining the distance that the device 16 has been displaced in each direction is within the contemplation of this invention.

It is apparent that a device 16 taught by this invention which disposes displaceable measuring means along three axes of a cartesian coordinate system and which disposes the measuring means located in a plane perpendicular to the reference axis extending through the device a predetermined distance plus a known overage distance from the axis and which provides gauge means to indicate when abutting contact between the measuring means and the member to be measured is sufficient to displace the measuring means the predetermined overage distance, and when utilized with the means of accurately ascertaining the displacement in each direction between abutting contacts, an accurate measurement of a member of each direction can be obtained.

I claim as my invention:

1. A device for measuring the dimensions of a member comprising:
   a casing having an opening defining a reference axis therethrough,
   a first and a second pair of measuring pins movably mounted in said casing, each pin in each pair being 180° from the other, the first pair being orthogonal to the second pair, each pin in each pair terminating in a tip with each tip being displaceable in a plane perpendicular to said reference axis, each tip of each pin being disposed a predetermined distance plus a finite overage distance from said reference axis,
   means connected to said pairs of pins for translating forces exerted on said pairs in said perpendicular plane to forces directed along said axis, said means including an axially displaceable cylindrical member and a spring biasing said cylindrical member against said pairs of measuring pins,
   a third measuring element orthogonal to said pairs and mounted for axial movement through said opening within said casing, said third measuring element mounted on said cylindrical member,
   gauge means operatively associated with said force translating means and said third measuring element for indicating displacement thereof, said gauge means including an activating member engaged against said cylindrical member, indicating displacements of said first and second pairs of measuring pins and of said third measuring element,
   said gauge means responding to forces translated along said reference axis by said cylindrical member of said translating means from said first pair of pins against said spring bias to indicate when abutting contact between one of said first pair of pins and said member have displaced one of said first pair said finite overage distance so as to dispose said member exactly said predetermined distance from said reference axis,
   said gauge means responding to forces translated along said reference axis by said cylindrical member of said translating means from said second pair of pins against said spring bias to indicate when abutting contact between one of said second pair of pins and said member have displaced one of said second pair said finite overage distance so as to dispose said member exactly said predetermined distance from said reference axis,
   said gauge means responding to forces acting along said reference axis when abutting contact between said member and said third measuring element displaces said third measuring element and said cylindrical member against said spring bias to indicate the magnitude of said displacement of said third measuring element.

2. The device of claim 1, wherein said device is adaptable for mounting upon a machine tool having means for indicating the magnitude of displacement of said device,
   said device further comprising mounting means for attaching said device to said machine tool.

3. The device of claim 1, wherein:
   said tips of each of said measuring pins in said first and second pairs of measuring pins are rounded, and
   wherein said rounded tips are disposed so that each of said rounded tips is coincidental with a separate point on a circle in said plane perpendicular to said reference axis, said circle being centered in said plane on said reference axis and having a radius in equal length to said predetermined distance plus said finite overage distance.

4. The device of claim 1, further comprising:
   locking means for prohibiting simultaneous displacement of said first and said second pair of measuring pins.

5. The device of claim 1, wherein:
   said cylindrical member has a frustoconical surface area thereon,
   and wherein said force translation means further comprises,
   a translation element connected to said pairs of measuring pins, said translation element having a frustoconical surface area thereon engaging said frustoconical surface area on said cylindrical member, said translation element being slidably disposed within said casing in a plane perpendicular to said reference axis,
   said translation element responding to forces imposed thereon when abutting contact between any one of said pins and said member displaces said pin by moving slidably within said casing in said perpendicular plane,
   the movement of said translation element displacing said cylindrical member engaged thereagainst, said cylindrical member displacing against the force of said biasing spring to deflect said activating member on said gauge means.

6. A device for measuring the dimensions of a member comprising:
   a casing having an opening defining an axis extending therethrough,
   a first and a second pair of measuring pins movably mounted in said casing, each pin in each pair being 180° from the other, said first pair being orthogonal to said second pair, each pin in each pair terminating in a tip with each tip being displaceable in a plane perpendicular to said axis, each tip being disposed a predetermined distance plus a finite overage distance from said reference axis,
   translating means connected to said first and second pairs of pins for translating forces exerted thereon in said perpendicular plane to forces directed along said axis, said translating means comprising:
   a first translation element disposed slidably within said casing along said axis and having a frustoconical surface area thereon,
   a second translation element connected to said pairs of pins and having a frustoconical surface area thereon engaging said frustoconical surface area on said first translation element, said second translation element being slidably disposed within said casing in said perpendicular plane,
   said second translation element responding to forces imposed thereon when abutting contact with a member displaces any one pin by displacing slidably within said casing in said perpendicular plane,
   the displacement of said second translation element transferring said force imposed thereon through said engaged frustoconical surfaces to displace said first translation element along said axis, a third measuring element disposed perpendicular to said pairs of measuring pins and displaceable through said opening along said axis, gauge means operatively associated with said force translating means and said third measuring element for indicating displacements thereof, said gauge means responding to forces translated along said axis by said translating means from said pairs of pins to indicate when abutting contact between any one of said pins and said member has displaced said pin said overage distance to dispose said member exactly said predetermined distance from said axis, said gauge means responding to forces acting along said axis when abutting contact between said member and said third measuring element displaces said third measuring element to indicate the magnitude of said displacement thereof, said gauge means being biased so as to be activated only when forces generated by abutment with said member are exerted on said gauge means along said axis, and, locking means for prohibiting simultaneous displacement of one pin of said first pair and one pin of said second pair, said locking means comprising:

a first runner element mounted within said casing in a direction parallel to the direction of displacement of said first pair of measuring pins, a slide member disposed for slidable movement within said casing on said first runner, a second runner element mounted on said slide member in a direction parallel to the direction of displacement of said second pair of measuring pins and perpendicular to the direction of displacement of said first pair of measuring pins, said second translation element being slidably mounted on said second runner element, displacement of one of said second pair of measuring pins slidably displacing said second translation element on said second runner and prohibiting slidable displacement of said slide member on said first runner element, said slide member remaining stationary during displacement of said second translation element on said second runner and, displacement of one of said first pair of measuring pins slidably displacing both said slide member and said second translation element along said first runner element and prohibiting slidable displacement of said second translation member on said second runner.

* * * * *